United States Patent
Reznik

(10) Patent No.: US 11,279,082 B2
(45) Date of Patent: Mar. 22, 2022

(54) GENERATIVE MANUFACTURING OF COMPONENTS WITH A HEATABLE BUILDING PLATFORM AND APPARATUS FOR IMPLEMENTING THIS METHOD

(71) Applicant: Siemens Aktiengesellschaft, Munich (DE)

(72) Inventor: Daniel Reznik, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 459 days.

(21) Appl. No.: 16/072,578

(22) PCT Filed: Jan. 4, 2017

(86) PCT No.: PCT/EP2017/050108
§ 371 (c)(1),
(2) Date: Jul. 25, 2018

(87) PCT Pub. No.: WO2017/129381
PCT Pub. Date: Aug. 3, 2017

(65) Prior Publication Data
US 2019/0030791 A1  Jan. 31, 2019

(30) Foreign Application Priority Data

Jan. 28, 2016 (EP) .................................... 16153141

(51) Int. Cl.
*B29C 64/393* (2017.01)
*B29C 64/153* (2017.01)
(Continued)

(52) U.S. Cl.
CPC ............ *B29C 64/153* (2017.08); *B22F 10/20* (2021.01); *B29C 64/295* (2017.08); *B33Y 30/00* (2014.12);
(Continued)

(58) Field of Classification Search
CPC .......................... B29C 64/245; B29C 64/295
See application file for complete search history.

(56) References Cited

U.S. PATENT DOCUMENTS

| 2004/0056022 A1 | 3/2004 | Meiners et al. ............... 219/634 |
| 2005/0173380 A1 | 8/2005 | Carbone .................. 219/121.31 |

(Continued)

FOREIGN PATENT DOCUMENTS

| CN | 202591611 U | 12/2012 | .............. B22F 3/105 |
| DE | 102007057450 A1 | 6/2009 | .............. B22F 3/105 |

(Continued)

OTHER PUBLICATIONS

Machine translation of WO 2008143106, retrieved from WIPO database May 12, 2021 (Year: 2021).*

(Continued)

*Primary Examiner* — Timothy Kennedy
(74) *Attorney, Agent, or Firm* — Slayden Grubert Beard PLLC

(57) ABSTRACT

Various embodiments may include a method for the generative manufacturing of a component on a building platform comprising: applying particles of a building material layer by layer to the building platform and then to the component under construction; fusing the applied particles with an energy beam; and heating the component under construction with a heating device associated with the building platform. A reference temperature $T_r$ for each layer produced and a tolerance range for the reference temperature $T_r$ are defined. A heating power of the heating device is lowered as sequential layers are fused to the extent that the tolerance range for a reference temperature $T_r$ is maintained in a last layer produced.

11 Claims, 2 Drawing Sheets

(51) Int. Cl.
*B33Y 30/00* (2015.01)
*B33Y 50/02* (2015.01)
*B29C 64/295* (2017.01)
*B22F 10/20* (2021.01)
*B22F 10/30* (2021.01)

(52) U.S. Cl.
CPC .............. *B33Y 50/02* (2014.12); *B22F 10/30* (2021.01); *B22F 2999/00* (2013.01); *Y02P 10/25* (2015.11)

(56) References Cited

U.S. PATENT DOCUMENTS

| | | | | |
|---|---|---|---|---|
| 2006/0157892 A1* | 7/2006 | Larsson | ................ | B22F 10/20 264/308 |
| 2007/0122562 A1 | 5/2007 | Adams | ................ | 427/532 |
| 2009/0206522 A1* | 8/2009 | Hein | ................ | B29C 64/153 264/497 |
| 2011/0042031 A1* | 2/2011 | Furlong | ................ | B22F 10/00 164/80 |
| 2012/0213659 A1 | 8/2012 | Bayer et al. | ................ | 419/53 |
| 2015/0064050 A1 | 3/2015 | Retze et al. | ................ | 419/53 |
| 2015/0367415 A1 | 12/2015 | Buller et al. | ................ | 419/53 |
| 2017/0151631 A1* | 6/2017 | Kuo | ................ | B29C 64/245 |

FOREIGN PATENT DOCUMENTS

| | | | | |
|---|---|---|---|---|
| DE | 102009051479 A1 | 5/2011 | ............ | B22F 3/105 |
| DE | 102012206122 A1 | 10/2013 | ............ | B22F 3/105 |
| DE | 102013001374 A1 | 7/2014 | ............ | B22F 3/105 |
| EP | 1355760 | 5/2005 | ............ | B22F 3/105 |
| WO | 2008/143106 A1 | 11/2008 | ............ | B22F 3/105 |
| WO | 2017/129381 A1 | 8/2017 | ............ | B22F 3/105 |

OTHER PUBLICATIONS https://www.electronicshub.org/open-loop-system/#Advantages_of_Open_loop_control_System (Apr. 23, 2021) (Year: 2021).*
Chinese Office Action, Application No. 201780008207.5, 6 pages, dated Jul. 29, 2019.
International Search Report and Written Opinion, Application No. PCT/EP2017/050108, 10 pages, dated Apr. 12, 2017.

* cited by examiner

GENERATIVE MANUFACTURING OF COMPONENTS WITH A HEATABLE BUILDING PLATFORM AND APPARATUS FOR IMPLEMENTING THIS METHOD

CROSS-REFERENCE TO RELATED APPLICATIONS

This application is a U.S. National Stage Application of International Application No. PCT/EP2017/050108 filed Jan. 4, 2017, which designates the United States of America, and claims priority to EP Application No. 16153141.3 filed Jan. 28, 2016, the contents of which are hereby incorporated by reference in their entirety.

TECHNICAL FIELD

The present disclosure relates to manufacturing. Various embodiments may include a method for the generative manufacturing of a component on a building platform.

BACKGROUND

In generative manufacturing, particles of a building material are first applied layer by layer to the building platform (which serves as a base for the first layer of the component) and then to the component under construction (the first layer of which, and possibly further layers, has or have already been produced on the building platform) and are fused by an energy beam, for example an electron beam or a laser beam. The fusing has the effect that the particles of the building material that form the component to be manufactured are firmly held together. Fusing may take place for example by melting or sintering. Suitable as melting methods are for example selective laser melting (also known as SLM), electron beam melting (also known as EBM) or laser metal deposition (also known as LMD). To be mentioned as an example of a sintering method is selective laser sintering (also known as SLS).

According to EP 1 355 760 B1, an SLM method in which a building platform on which the component is intended to be constructed is designed as a heating plate is described. A temperature sensor is provided, with which closed-loop control of the supply of energy to the heating plate can be carried out. With this closed-loop control, the heating plate can be kept at a desired temperature level. For example, the heating plate can be operated at a temperature level of 500° C. during the entire process. When carrying out the method, however, as the height of the component increases, the temperature of the layer of a component under construction that is to be produced at the particular time does not correspond to the temperature set by means of the heating plate, but is higher. This adversely influences the quality of the component manufactured.

In the case of an LMD method according to DE 10 2009 051 479 A1, a turbine blade is produced for example. In the case of this method, the buildup and joining zone is to be heated to a temperature just below the melting point of the material of the component. It is intended in this way to influence and control the crystal structure of the component constructed. A zone furnace is to be used for heating up the joining zone, the buildup and joining zone lying in the high temperature zone thereof. In the zone furnace, a predetermined temperature gradient can be set perpendicularly to the layers in the regions of the turbine blade that have already been produced. For this purpose, the building platform, which itself is not heatable, is lowered into the zone furnace. The heating by means of the zone furnace is however technically very complex.

Another possibility, according to DE 10 2012 206 122 A1, is to perform inductive local heating that is individually adapted to the component geometry, with a number of induction coils being provided in the apparatus for this purpose. The induction coils are for this purpose activated by means of an open-loop and/or closed-loop control and can in this way also introduce heat locally into the component under construction. As a result, for example, formation of cracks in the component under construction can be avoided. However, the technical complexity of this solution is also comparatively great. The generative method uses an energy beam for selectively irradiating a powder bed in which the component is to be manufactured.

SUMMARY

In the methods described herein, the component is manufactured layer by layer on the building platform. The building platform consequently also serves as a base for producing the first layer of the component. The component may for example be manufactured directly on the building platform by laser metal deposition, the particles of the building material being added directly to the laser beam. Alternatively, a powder bed may be created on the building platform, only the particles of the building material in the powder bed that are necessary for forming the component being melted in each case. The building platform may be equipped with a heating device, the component under construction being heated by means of the building platform. In this way, heating of the component under construction is possible, in order for example to reduce the necessary power of the energy beam for melting the particles.

Various embodiments of the disclosure may include an apparatus for the layer-by-layer generative manufacturing of a component with a building platform for the component to be manufactured, the building platform being equipped with a heating device. Such an apparatus has the elements required to enable it to be used for carrying out the method described at the beginning.

For example, in some embodiments, a method for the generative manufacturing of a component (21) on a building platform (14) in which particles of a building material are first applied layer by layer to the building platform (14) and then to the component (21) under construction and are fused by an energy beam (20), the building platform being equipped with a heating device (24) and the component (21) under construction being heated by means of the building platform (14), is characterized in that a reference temperature $T_r$ for the layer produced in each case and a tolerance range for the reference temperature $T_r$ are defined and the heating power of the heating device (24) is lowered as the method progresses to the extent that the tolerance range for a reference temperature $T_r$ is maintained in the layer that is last produced in each case.

In some embodiments, an open-loop control, which makes allowance for a fusing power $P_S$ of the energy beam (20) and the heat conducting properties of the component (21) as input variables for lowering of the heating power of the heating device (24), is used for the lowering of the heating power.

In some embodiments, the fusing power $P_S$ is calculated from the nominal power of the energy beam (20), allowance being made for the amount of energy that is reflected by the particles as a power loss.

In some embodiments, the fusing power $P_S$ is calculated from the nominal power of the energy beam (20), allowance being made for switching-off time intervals of the energy beam as a reduction of the fusing power with respect to the nominal power.

In some embodiments, allowance is made for the heat conducting properties in the form of a thermal resistance $R_{th}$ or a coefficient of thermal conductivity of the component.

In some embodiments, the first layer of the component (21) under construction is heated by means of the building platform (14) to a temperature level that is at least as high as a calculated or experimentally determined heating of the uppermost layer of the component completed without using the heating device (24).

In some embodiments, the heating of the uppermost layer of the completed component is calculated in accordance with the following model:

$$T_1 = T_0 + R_{th} \cdot P_S$$

where $T_1$ is the temperature of the completed component, $T_0$ is the starting temperature of the building platform without heating, $R_{th}$ is the thermal resistance of the completed component and $P_S$ is the fusing power of the energy beam.

In some embodiments, a closed-loop control, which makes allowance for a measured surface temperature $T_i$ of the workpiece being manufactured as a controlled variable for lowering of the heating power of the heating device (24), is used for the lowering of the heating power, the measurement being carried out outside a melt bath (28) produced by the energy beam or during switching-off time intervals of the energy beam (20).

In some embodiments, the surface temperature $T_i$ of the workpiece being manufactured is determined by measuring the thermal radiation emanating from the surface of the workpiece.

In some embodiments, a closed-loop control, which makes allowance for a measured surface temperature $T_i$ of the workpiece being manufactured as a controlled variable, is additionally used, the measurement being carried out outside a melt bath (28) produced by the energy beam or during switching-off time intervals of the energy beam (20), and in that the rate of lowering the heating power prescribed by the open-loop control is corrected if the measured surface temperature $T_i$ does not correspond to the reference temperature $T_r$.

In some embodiments, a correction interval, in particular a correction interval of +/−20%, is prescribed for correcting the rate of lowering the heating power.

In some embodiments, the surface temperature $T_i$ of the workpiece being manufactured is determined by measuring the thermal radiation emanating from the surface of the workpiece.

As another example, some embodiments may include an apparatus for the layer-by-layer generative manufacturing of a component (21) with a building platform (14) for the component (21) to be manufactured, the building platform (14) being equipped with a heating device (24), characterized in that the apparatus has an open-loop control unit (33) for the heating device (24) with which a method as claimed in one of claims 2 to 7 can be carried out or has a closed-loop control unit (26) for the heating device (24) with which a method as claimed in either of claims 8 and 9 can be carried out.

In some embodiments, there is a building platform (14) for the component (21) to be manufactured, the building platform being equipped with a heating device (24), characterized in that the apparatus has an open-loop control unit (33) and a closed-loop control unit (26) for the heating device (24) with which a method as claimed in one of claims 10 to 12 can be carried out.

The teachings of the present disclosure describe various methods for the generative manufacturing of a component and apparati for implementing this method by which the component can be kept at a temperature level that is as constant as possible during the generative manufacturing process by comparatively simple means, this temperature level being intended to be obtained in the layer of the component that is in the process of being produced.

BRIEF DESCRIPTION OF THE DRAWINGS

Further details of the disclosure are described below on the basis of the drawings. Elements of the drawings that are the same or corresponding are respectively provided with the same reference signs and are only explained more than once if there are differences between individual figures, in which.

DETAILED DESCRIPTION

Figure 1:
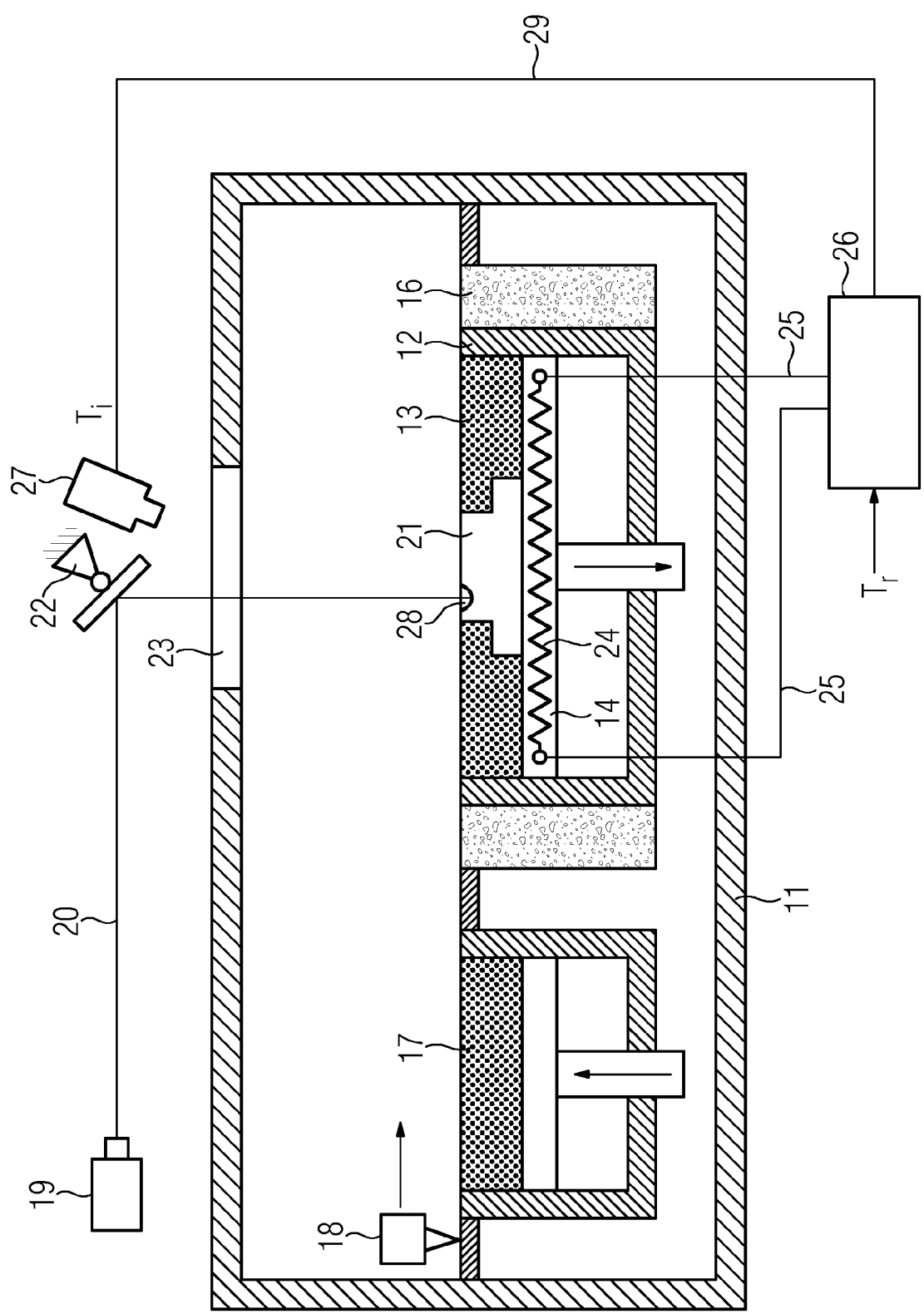
FIG. 1 shows schematically in section an exemplary embodiment of the apparatus according to the teachings herein with implemented closed-loop control of the heating power in which an exemplary embodiment of the method according to the teachings herein is carried out.

The teachings herein include various methods such as that specified at the beginning by the heating power, with the heating device being lowered as the method progresses to the extent that a defined tolerance range for a reference temperature $T_r$ is maintained in the respective layer that is last produced. The reference temperature $T_r$ means the temperature in the layer that is obtained in the case of melting generative manufacturing methods after it has solidified and cooled down. It is therefore not based on the temperature in the melt bath or the heat affected zone of the melt bath, which lies significantly higher than the temperature obtained in the layer in the process of being produced after it has solidified. However, the temperature is still higher than after the component has completely cooled down.

The power introduced into the component by the heating device and the energy beam can be explained by the fact that the workpiece to be produced has a not insignificant thermal resistance. In the case of metal powders that are processed by generative methods, the thermal resistance $R_{th}$ is typically between 1 and 10 per K/W. The energy beam for fusing the particles inputs on average over time a fusing power $P_S$ (a melting power in the case of melting methods or a sintering power in the case of sintering methods) that can be put at 10 to 50 W. Because of the thermal resistance of the component under construction, this heat cannot be dissipated quickly enough, and so the surface temperature of the workpiece, the temperature of the layer being produced at the particular time, increases continuously in the course of the process of building up the component. As a result, the maximum heating can be estimated while making allowance for $R_{th}$ and $P_S$, with $R_{th}$=5 K/W and $P_S$=30 W being assumed hereinafter by way of example.

$$R_{th} \cdot P_S = 5 \text{ K/W} \cdot 30 \text{ W} = 150 \text{ K}$$

According to this estimate, the temperature of the component may be up to 150 K above the set temperature of the heating plate. Since, however, this estimate does not make any allowance for thermal losses that are caused by convection and thermal radiation, the temperature increases will be lower. However, it has been found that the effect of inadequate heat dissipation because of the thermal resistance of the component represents the variable for which the greatest allowance must be made.

In some embodiments, the heating power can be lowered as the method progresses. In general, it must at the beginning of the method be brought at least to a level such that the maximum heating of the component can be balanced out as the process progresses. For the aforementioned example, consequently, a temperature level that is at least 150 K above the starting temperature of the building platform without heating should be set. Allowance is made for this starting temperature by $T_0$, the heating $T_1$ of the uppermost layer of the completed component computationally giving $$T_1 = T_0 + R_{th} \cdot P_S$$

Since the reference temperature $T_r$ can never be maintained exactly in practice, a permissible tolerance range within which the temperature may fluctuate is defined. This tolerance range depends on the requirements that are made on the component to be manufactured and the material to be processed. The aim in the generative manufacturing of the component may be to keep down stresses caused by the cooling down of the component or to set in the component a certain metallic microstructure, which is influenced by the rate at which the component cools down. The tolerance range may for example be +/−20 K.

Lowering the heating power of the heating device in the building platform provides on the one hand a simple heating device can be used, on the other hand that dissipation of heat through the component in the direction of the building platform is possible by allowance being made for the heating power produced by the energy beam. This is only possible by reducing the heating power in the building platform, because in this way a temperature gradient between the layer in production and the building platform can form. It is possible as a result to dispense with technically much more complicated direct heating of the layer in production. In some embodiments, an open-loop control, which makes allowance for a fusing power $P_S$ of the energy beam and the heat conducting properties of the component as input variables for lowering of the heating power of the heating device, is used for the lowering of the heating power. The fusing power (i.e. melting power in the case of a melting generative method or sintering power in the case of a sintering generative method) makes allowance for the heat input of the energy beam into the component. The nominal power of the energy beam may advantageously be used in the determination of the fusing power $P_S$, the fusing power being calculated by allowance being made for the amount of energy that is reflected by the particles as a power loss. In the case of steel particles, for example, this is about 67%.

Furthermore, in the calculation of the fusing power $P_S$ from the nominal power of the energy beam, allowance may be made for the fact that switching-off time intervals of the energy beam bring about a reduction in the fusing power on average over time. For example in the case of powder-bed-based generative manufacturing methods, switching-off intervals are caused by the fact that, for producing a new layer of powder in the powder bed, the irradiation of the same with the energy beam is interrupted. For example in relation to the irradiating times, the switching-off time intervals may for example be used as a percentage deduction in the calculation of the fusing power $P_S$.

In some embodiments, the first layer of the component under construction is heated by means of the building platform to a temperature level that is at least as high as a calculated or experimentally determined heating of the uppermost layer of the component completed without using the heating device (as already mentioned, this heating of the uppermost layer is determined outside a possible melt bath or the heat affected zone thereof). If this temperature level is set by means of the building platform, it is possible by reducing the heating power to 0 to achieve the effect that the calculated or determined temperature level is reached in the component, and this was also the temperature already in the layers lying thereunder during the production of the component. The cooling down of the component therefore takes place slowly, whereby the formation of cooling-related stresses in the component can be advantageously reduced.

Of course, a higher temperature level than that determined or measured may also be set, it also being possible in this case to ensure a uniform temperature level of the layer respectively produced by the heating power of the heating device being lowered. However, in this case the heating power of the heating device is also required still in the production of the uppermost layer of the component.

In some embodiments, as an alternative to open-loop control, a closed-loop control, which makes allowance for a measured surface temperature $T_i$ (the actual temperature) of the workpiece being manufactured as a controlled variable for lowering of the heating power of the heating device, is used for the lowering of the heating power, the measurement being carried out outside a melt bath produced by the energy beam or during switching-off time intervals of the energy beam. In the case of sintering generative manufacturing methods, there is no melt bath, and so the measurement can always be carried out. In the case of a closed-loop control method, a correction of the heating power of the heating device is therefore determined by means of the temperature that is actually prevailing in the layer that is in production or has just been produced, allowance for this being made in the form of a controlled variable. The reference variable is provided by the reference temperature $T_r$, with the heating power of the heating device being influenced as the manipulated variable. The closed-loop control circuit thus formed must be designed such that the dynamic behavior of the controlled variable (control oscillations) is within the defined tolerance range for the reference temperature $T_r$.

In some embodiments, the surface temperature $T_i$ of the workpiece being manufactured is determined by measuring the thermal radiation emanating from the surface of the workpiece. This can be carried out contactlessly. A pyrometer or a thermal camera may for example be used for the measurement. The measurement may be performed at individual measuring points or the entire surface area of the layer under construction is used. As already mentioned, if there is a melt bath, in this case the region of the melt bath and the heat affected zone are ignored.

In some embodiments with the already described open-loop control, a closed-loop control, which makes allowance for the measured surface temperature $T_i$ of the workpiece being manufactured as a controlled variable, is additionally used, the measurement being carried out outside a melt bath produced by the energy beam or during switching-off time intervals of the energy beam, and that the rate of lowering the heating power prescribed by the open-loop control is corrected if the measured surface temperature $T_i$ does not correspond to the reference temperature $T_r$. The closed-loop control is performed on the basis of the criteria already stated. The correction of the rate of lowering the heating power is performed in such a way that the rate is increased if $T_i$ becomes too high and is reduced if $T_i$ becomes too low. Therefore, the model prescribed by the open-loop control is taken as a basis for the rate. For example, the rate of lowering the heating power may be chosen as constant. However, more complicated models that make allowance for the component geometry may also be taken as a basis. Furthermore, empirical values that have for example been obtained by a test run of the manufacture of the component may be used in the function of lowering the heating power that is prescribed by the open-loop control.

Irrespective of which model is used for the open-loop control for lowering the heating power, the development of the actual surface temperature $T_i$ may deviate from the desired value because of deviations in practice from the model. In this case, a correction of the guidance of the heating power by the closed-loop control circuit is possible, to return to the reference temperature $T_r$. The advantage of a combination of an open-loop control with a closed-loop control is that a drift of the actually measured surface temperature $T_i$ takes place slowly and a closed-loop control that behaves robustly in response to a change can be produced with little complexity as a stable closed-loop control circuit.

In some embodiments of the combined variant, it may be provided that a correction interval is prescribed for correcting the rate of lowering the heating power. A correction interval should be understood as meaning a parameter window that allows a correction only to a certain extent. This correction interval may be for example in the range of +/−20% of the heating power at the particular time. Alternatively, a correction interval may also be given as an absolute value by which the heating power may at most be increased or lowered within a certain time interval.

In some embodiments, the surface temperature $T_i$ of the workpiece being manufactured is determined by measuring the thermal radiation emanating from the surface of the workpiece. As already explained in detail, a pyrometer or a thermal camera may for example be used for this.

In some embodiments, the apparatus specified at the beginning in that the apparatus has an open-loop control unit for the heating device with which the open-loop control method described above can be carried out. Alternatively, a closed-loop control unit with which the closed-loop control method described above can be carried out may also be provided. A further alternative provides that the apparatus has an open-loop control unit and a closed-loop control unit for the heating device, with which the combined open-loop and closed-loop control method explained above can be carried out. The apparatus is therefore used for carrying out one of the methods described above, thereby achieving the advantages already explained above.

An apparatus according to FIG. 1 has a process chamber 11, in which a device 12 for receiving a powder bed 13 is provided. This device includes a building platform 14, which can be lowered layer by layer in the device 12 in the manner of a plunger, to create space for the powder bed 13. The device is surrounded by thermal insulation 16 of a porous material, such as for example ceramic.

For producing the powder bed 13, a power store 17 is provided, by means of which powder can be transported onto the surface of the powder bed 13 with the aid of a stripper 18. Once a new layer of powder has been created on the powder bed 15, it is melted locally with the aid of an energy beam 20 produced by a laser 19, whereby a new layer of a component 21 in construction is produced. For this purpose, the energy beam 20 is input into the process chamber 11 through a window 23 by means of a deflecting optical unit 22.

For controlling the temperature of the component 21 under construction, a heating device 24 is provided in the building platform 14 in the form of an electrical resistance heater. This is supplied with electrical energy by means of connection lines 25, the heating power that is provided by the connection lines 25 being determined by a closed-loop control unit 26.

Transferred to the closed-loop control unit 26 as a reference variable is a setpoint temperature $T_r$, which is used as a reference value for the temperature that is intended to prevail at the surface of the component 21 under construction. Maintaining this setpoint temperature $T_r$ is monitored by means of a temperature sensor 27 in the form of a thermal camera or a pyrometer. The determined surface temperature (actual temperature) $T_i$ is measured outside a melt bath 28, which is produced by the energy beam 20 in the powder bed or on the surface of the component 21 under construction. The signal of the measured temperature $T_i$ is transferred by means of a signal line 29 to the closed-loop control unit 26, and consequently represents the controlled variable for the closed-loop control circuit realized by means of the closed-loop control unit 26. To be understood as the disturbance variable is primarily the heating power that is introduced into the component 21 by the energy beam 20. Depending on the additional heating by the energy beam 20, the heating power is taken back through the closed-loop control unit 26, the heating power in the closed-loop control circuit representing the manipulated variable.

Figure 2:
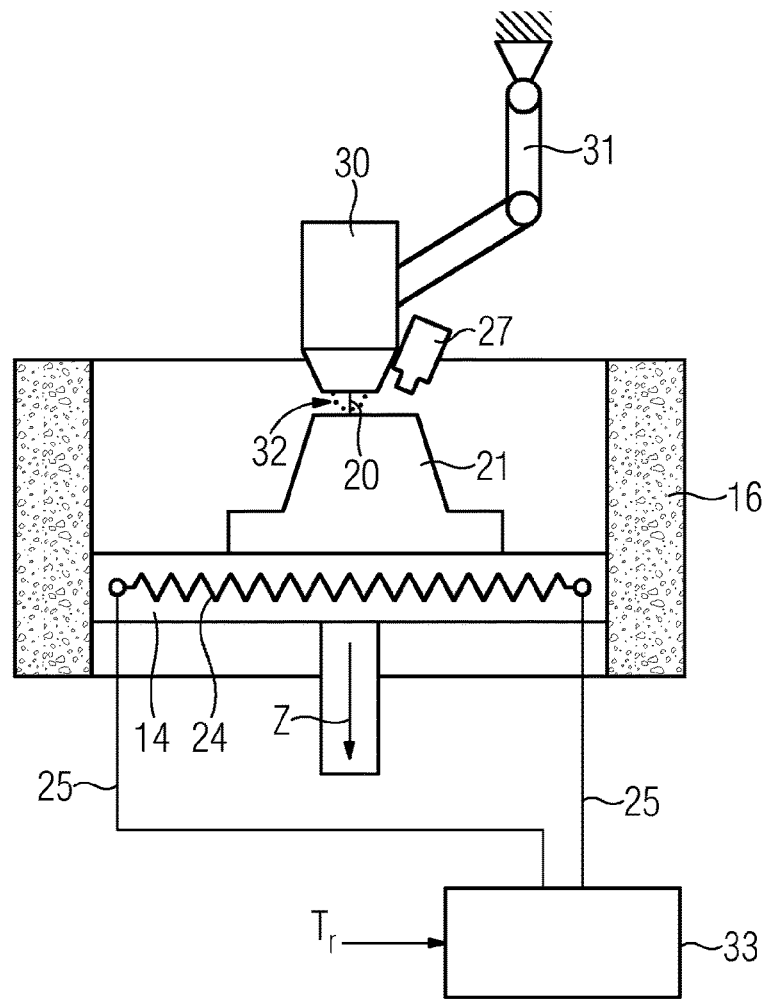
FIG. 2 shows in section a further exemplary embodiment of the apparatus according to the teachings herein with implemented open-loop control in which an exemplary embodiment of the method according to the teachings herein is carried out and FIG. 3 shows a block diagram of a combined open-loop control and closed-loop control for the heating device, as can be installed in apparatuses according to FIG. 1 or 2.

The apparatus according to FIG. 1 may be used for laser melting or laser sintering. Instead of a laser 19, a device for producing an electron beam could also be used, the apparatus in this case being designed for electron beam melting (not represented). By contrast, the apparatus according to FIG. 2 is suitable for laser metal deposition. Provided for this purpose is an application head 30, which can be brought into position above the building platform 14 by means of a pivot arm 31. In this way, the component 21 is produced layer by layer on the building platform 14, the application head 30 accommodating not only a laser, not represented any more specifically, for producing the energy beam 20 but also a powder conveyor. By means of the powder conveyor, powder 32 is transported directly to the point of incidence of the energy beam 20 and melted at the surface of the component 21 under construction.

For adapting the temperature on the surface of the component 21 under construction, an open-loop control unit 33 is provided. By means of this, the connection lines 25 of the heating device 24 are activated, and so the heating power for the heating device 24 can be adjusted. The reference temperature (setpoint temperature) $T_r$ is transferred as an input variable into the open-loop control unit. Stored in this is a mathematical model, with the aid of which the temperature development at the surface of the component being manufactured at the particular time in each case (meaning the surface at which the powder 32 is melted by means of the energy beam 20) can be determined. This takes place in dependence on a lowering displacement z of the building platform 14. For example, for an assumed case of non-intervention of the open-loop control, a linear temperature increase at the surface of the component 20 can be assumed, an initial temperature $T_0$ prevailing during the production of the first layer and a temperature $T_1$, which is determined by means of the calculation formula specified above, being determined when producing the last layer. In order to keep the surface of the component 21 under construction constant, the heating power at the heating device 24 is however taken back linearly during the manufacture of the component.

Also provided on the application head 30 is a temperature sensor 27, which may not used by the open-loop control unit 33. However, a closed-loop control according to FIG. 1 could be realized with the aid of the temperature sensor 27. It is equally also possible in the case of the apparatus according to FIG. 1 to provide an open-loop control unit according to FIG. 2. Lastly, it is also possible in the case of both apparatuses according to FIG. 1 and FIG. 2 to implement a combined open-loop control and closed-loop control according to FIG. 3.

Figure 3:
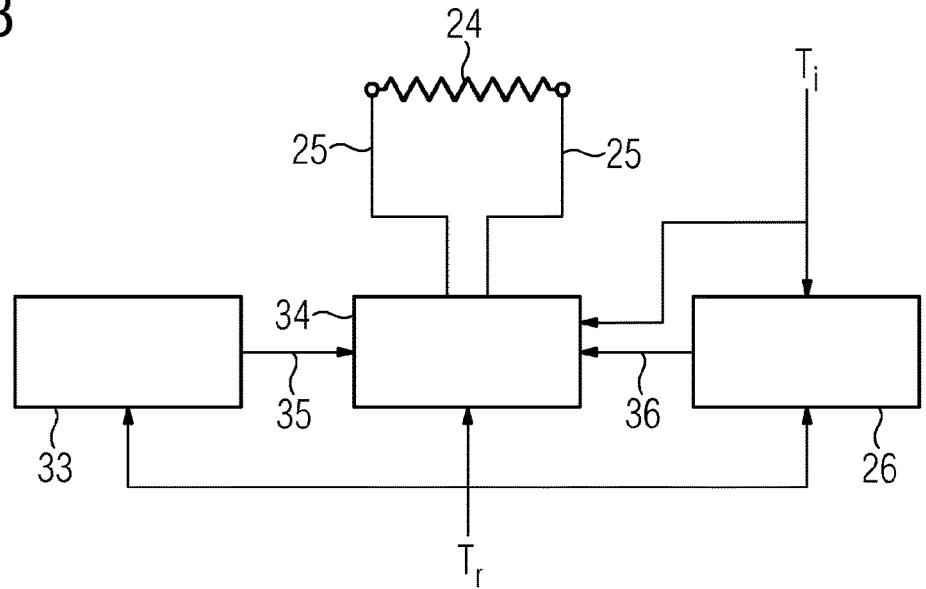

According to FIG. 3, a block diagram for a combined open-loop control and closed-loop control is represented. Therefore, both an open-loop control unit 33 and a closed-loop control unit 26 are used. Both the open-loop control unit 33 and the closed-loop control unit 26 use as an input signal the reference temperature $T_r$, which is intended to prevail at the surface of the component just being manufactured. The closed-loop control unit 26 also receives a signal for the surface temperature actually prevailing at the surface (actual temperature) $T_i$, which is determined by a temperature sensor that is not represented. Both the open-loop control unit 33 and the closed-loop control unit 26 produce as an output signal a value for the heating power with which the heating device 24 is to be operated. These are passed on as input variables to an open-loop control module 34, the open-loop control module 34 supplying the connection lines 25 with the required heating power.

In the open-loop control module 34, consequently, a control signal 35 of the open-loop control and an actuating signal 36 of the closed-loop control are processed and the required heating power is calculated from these. As long as the actual temperature $T_i$ corresponds to the required temperature $T_r$, allowance is only made for the control signal 35. As soon as $T_r$ and $T_i$ diverge, a correction of the heating power with which the heating device 24 is subsequently operated is calculated on the basis of the actuating signal 36. For this purpose, the signals $T_r$ and $T_i$ are also processed by the open-loop control module 34.

In the representation according to FIG. 3, the functions of the open-loop control, the closed-loop control and the supplying of the heating device 24 with a heating power are divided between the open-loop control unit 33, the closed-loop control unit 26 and the open-loop control module 34. This serves primarily for overall clarity and for explaining the functionalities. In reality, these blocks may of course also be combined in one functional unit. This may for example be a computer that ensures all of the functionalities, and thereby makes allowance for the input variables and output variables mentioned.

What is claimed is:

1. A method for the generative manufacturing of a component on a building platform, the method comprising:
    applying particles of a building material in an active layer to the building platform and then to the component under construction;
    fusing the particles in the active layer using an energy beam;
    calculating an expected temperature of a final layer at completion of the component;
    heating a first layer of the building material to the expected temperature with a heating device embedded in the building platform, the first layer in physical contact with the building platform and opposite the active layer of the component;
    wherein calculating the expected temperature depends at least in part on a nominal power of an energy beam and an amount of reflected energy based on characteristics of the particles;
    wherein a reference temperature $T_r$ for each layer produced and a tolerance range for the reference temperature $T_r$ are defined;
    and
    lowering a heating power of the heating device as sequential layers are fused to the extent that the tolerance range for a reference temperature $T_r$ is maintained in the final layer.

2. The method as claimed in claim 1, further comprising controlling the heating power with an open-loop control depending at least in part on a fusing power of the energy beam and the heat conducting properties of the component.

3. The method as claimed in claim 2, further comprising calculating the fusing power from the nominal power of the energy beam and switching-off time intervals of the energy beam as a reduction of the fusing power with respect to the nominal power.

4. The method as claimed in claim 2, further comprising adjusting the calculations based on heat conducting properties in the form of a thermal resistance or a coefficient of thermal conductivity of the component.

5. The method as claimed in claim 1, further comprising heating the first layer of the component under construction to a temperature level at least as high as a calculated or experimentally determined heating of the uppermost layer of the component completed without using the heating device.

6. The method as claimed in claim 5, further comprising calculating heating of the uppermost layer of the completed component with the following model:

$$T_1 = T_0 + R_{th} \cdot P_S$$

where $T_1$ is the temperature of the completed component, $T_0$ is the starting temperature of the building platform without heating, $R_{th}$ is the thermal resistance of the completed component and $P_S$ is the fusing power of the energy beam.

7. The method as claimed in claim 1, further comprising a closed-loop control, including measuring a surface temperature of the component being manufactured as a controlled variable for lowering of the heating power of the heating device;
    wherein measuring the surface temperature is carried out outside a melt bath produced by the energy beam or during switching-off time intervals of the energy beam.

8. The method as claimed in claim 7, further comprising determining the surface temperature of the component under construction by measuring the thermal radiation emanating from the surface of the workpiece.

9. The method as claimed in claim 2, further comprising a closed-loop control for a measured surface temperature of the component under construction;

wherein measuring the surface temperature is carried out outside a melt bath produced by the energy beam or during switching-off time intervals of the energy beam; and the rate of lowering the heating power prescribed by the open-loop control is corrected if the measured surface temperature does not correspond to the reference temperature.

10. The method as claimed in claim 9, further comprising implementing a correction interval for correcting the rate of lowering the heating power.

11. The method as claimed in claim 9, further comprising determining the surface temperature of the component under construction by measuring thermal radiation emanating from the surface of the component.

* * * * *